United States Patent
Gonzalez Prieto (10) Patent No.: US 10,494,112 B2
(45) Date of Patent: Dec. 3, 2019

(54) ENGINE COWLING WITH THREE-DIMENSIONALLY ADJUSTABLE HINGE

(71) Applicant: Rolls-Royce Deutschland Ltd & Co KG, Blankenfelde-Mahlow (DE)

(72) Inventor: Gonzalo Gonzalez Prieto, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 372 days.

(21) Appl. No.: 15/386,726

(22) Filed: Dec. 21, 2016

(65) Prior Publication Data
US 2017/0174352 A1    Jun. 22, 2017

(30) Foreign Application Priority Data
Dec. 22, 2015    (DE) .......... 10 2015 226 543

(51) Int. Cl.
B64D 29/06 (2006.01)
E05D 7/04 (2006.01)

(52) U.S. Cl.
CPC .......... B64D 29/06 (2013.01); E05D 7/0415 (2013.01); E05D 7/0423 (2013.01)

(58) Field of Classification Search
CPC ........ B64D 29/00; B64D 29/06; B64D 29/08; Y10T 16/53225; Y10T 16/53235; Y10T 292/705; Y10T 292/707; Y10S 292/60; E05D 7/0415; E05D 7/0423; E05F 7/005
See application file for complete search history.

(56) References Cited

U.S. PATENT DOCUMENTS

| | | | | |
|---|---|---|---|---|
| 2,494,347 A | * | 1/1950 | Matthews | B64D 29/08 16/260 |
| 3,251,088 A | * | 5/1966 | Boundy | E05D 7/0415 16/242 |
| 3,469,877 A | * | 9/1969 | Hutchison | E05B 15/025 174/102 R |
| 4,130,260 A | * | 12/1978 | Poe | B64C 1/14 244/129.5 |

(Continued)

FOREIGN PATENT DOCUMENTS

| | | |
|---|---|---|
| DE | 2918123 A1 | 11/1980 |
| DE | 3500423 A1 | 7/1986 |

(Continued)

OTHER PUBLICATIONS

European Search Report dated May 16, 2017 from counterpart European App No. 16205426.6.

(Continued)

*Primary Examiner* — Joseph W Sanderson
(74) *Attorney, Agent, or Firm* — Shuttleworth & Ingersoll, PLC; Timothy J. Klima (57) ABSTRACT

An engine cowling includes at least one cowling part, at least one door element and at least one hinge. The hinge connects the door element to the first cowling part in an openable and closable manner. The hinge can be adjusted in a three-dimensional manner in a first direction, a second direction and a third direction in order to change a relative position of the door element with respect to the first cowling part.

9 Claims, 5 Drawing Sheets

(56) References Cited

U.S. PATENT DOCUMENTS

| | | | | |
|---|---|---|---|---|
| 4,957,316 A * | 9/1990 | Frolov | .................. | E05C 19/166 292/251.5 |
| 5,052,077 A * | 10/1991 | Lautenschlager | ..... | E05D 7/0407 16/238 |
| 5,099,547 A | 3/1992 | Salice | | |
| 5,483,770 A * | 1/1996 | Marinoni | .............. | E05D 7/0423 16/229 |
| 5,694,665 A * | 12/1997 | Strickland | ............. | E05D 7/0423 16/237 |
| 6,155,520 A | 12/2000 | Giraud et al. | | |
| 6,205,617 B1 * | 3/2001 | Held | ..................... | E05D 7/0407 16/236 |
| 6,220,546 B1 * | 4/2001 | Klamka | ................. | B64D 29/00 244/129.4 |
| 6,334,588 B1 | 1/2002 | Porte | | |
| 7,594,301 B2 * | 9/2009 | Krajenke | ............. | E05D 7/0423 16/235 |
| 8,220,738 B2 * | 7/2012 | Calder | ................... | B64D 29/06 244/110 B |
| 8,439,308 B2 * | 5/2013 | Armstrong | ................ | B64C 7/02 244/129.4 |
| 8,707,517 B2 * | 4/2014 | Hofer | ..................... | E05D 5/065 16/240 |
| 8,864,189 B2 * | 10/2014 | Fournie | ................. | E05C 19/145 292/256.69 |
| 9,605,457 B2 * | 3/2017 | Humble | .................... | E05D 7/04 |
| 9,758,234 B2 * | 9/2017 | Harding | .................... | B64C 1/14 |
| 9,878,797 B2 * | 1/2018 | Ambite Iglesias | .... | B64D 29/06 |
| 2002/0073509 A1 | 6/2002 | Dean | | |
| 2005/0120517 A1 * | 6/2005 | Bonham | ................... | E05D 5/06 16/238 |
| 2012/0125010 A1 | 5/2012 | Michael et al. | | |
| 2015/0110613 A1 | 4/2015 | Aten | | |
| 2018/0216379 A1 * | 8/2018 | Spoelstra | ................. | E05D 3/14 |

FOREIGN PATENT DOCUMENTS

| | | |
|---|---|---|
| DE | 3522670 A1 | 1/1987 |
| DE | 3943330 C1 | 7/1991 |
| DE | 4016664 A1 | 11/1991 |
| DE | 69822134 T2 | 9/2004 |

OTHER PUBLICATIONS

German Search Report dated Oct. 12, 2016 from counterpart German App No. 102015226543.9.

* cited by examiner

ENGINE COWLING WITH THREE-DIMENSIONALLY ADJUSTABLE HINGE

This application claims priority to German Patent Application DE102015226543.9 filed Dec. 22, 2015, the entirety of which is incorporated by reference herein.

DESCRIPTION

The invention relates to an engine cowling with adjustable door elements to facilitate an exact closing of the door elements at the engine cowling, or the like.

Engine cowlings, in particular aircraft engine cowlings, usually have large door elements that are connected via hinges to a housing part or another part of the engine cowling. What is usually provided are two door elements that can be swung open in opposite directions in order to facilitate the best possible access to the engine during maintenance work. At that, the problem may occur that the door elements cannot be exactly closed or that a large gap and/or a misalignment is present between the closed door elements or between the door element and a housing part of the engine cowling. In such cases, there is the danger of a mechanic damaging the door element and/or the housing part while trying to lock it. Further, gaps that may possibly be present in the engine cowling at the abutment edges of neighboring cowling components are disadvantageous for the air flow, which results in additional resistance and additional losses during operation. Besides, badly fitting parts make an unacceptable impression on the customer from the optical and aesthetical point of view.

Thus, it is an objective of the present invention to provide an engine cowling that provides the possibility of adjusting a relative position between a housing part of the cowling or the like and a door element of the engine cowling or between two engine cowling parts in the opened and/or in the closed state, while at the same time being characterized by a simple structure and a simple, cost-effective manufacturability.

This objective is achieved through an engine cowling with features as disclosed herein. The present disclosure shows preferred further developments of the invention.

The engine cowling with the features disclosed herein has the advantage that a simple relative adjustment and thus an adjustment of a position of a door element relative to a cowling part, for example a housing part or the like of an engine cowling, is possible. In this manner, gaps or overlappings due to the manufacturing process can be compensated for by the adjustable position of the door elements. Also, geometrical variations of the door elements and/or of the housing parts, which may for example occur at the engine cowling due to the temperatures during operation, can be compensated for. This is achieved by the engine cowling having at least one hinge which connects a cowling part with a door element for opening and closing. The hinge has a three-dimensional adjustability in a first, second and third direction in order to change a relative position of the door element with respect to the cowling part. Thus, through the invention, a gap or an overlapping between the door element and a cowling component, for example a housing part of the engine cowling, can be compensated for through the adjustable hinge. Since, due to its size, the door element is usually connected to the first cowling part by multiple hinges, preferably all hinges are embodied in an adjustable manner. Thus, it can be avoided according to the invention that gaps and/or overlappings are present at the engine cowling, whereby a loss-free flow is possible at the engine cowling during operation.

The hinge preferably comprises a first and a second hinge element. Here, the first hinge element is preferably adjustable in the first and second direction and the second hinge element is adjustable in the third direction. Thus, the three-dimensional adjustability of the hinge is distributed to the first and the second hinge element.

A particularly simple structure and an exact adjustability results when the first, second and third direction are provided so as to be respectively perpendicular to one other. In this manner, an exact adjustment of the door element relative to the first cowling part may be achieved, wherein short adjustment tracks are possible.

What is further preferred is that the first hinge element comprises a first base area and a first cover area. At that, a relative position between the first base area and the first cover area may be varied. Here, the first cover area is preferably connected to a hinge body.

What is further preferred is that a first rack and pinion arrangement with a first pinion and a first toothing area is provided between the first base area and the first cover area for a relative adjustment in the first direction.

The second hinge element also preferably comprises a second base area and a second cover area, with their relative positions being modifiable with respect to each other. A second rack and pinion arrangement with a second pinion and a second toothing area is provided between the second base area and the second cover area in order to provide a relative adjustment in the second direction.

A simple structure and in particular a simple adjustability results if the first hinge element comprises a first and/or a second screw element. Here, the first screw element directly or indirectly drives the first pinion of the first rack and pinion arrangement, and the second screw element directly or indirectly drives the second pinion of the second rack and pinion arrangement. In this manner, a relative adjustment between the first base area and the first cover area is facilitated by rotating the first and/or second screw element. Hereby, an adjustability is defined at the first hinge element in one plane. The plane is defined by the first and second direction of the adjustment.

The first and second screw element preferably respectively have a tool meshing area. Further, first and second openings are provided in the engine cowling, wherein the tool meshing area is respectively arranged at one of the openings. In this way, the tool meshing area can be reached by means of a tool that is passed through the openings, and an adjustment can be carried out. Here, particularly an adjustment in the closed state of the engine cowling is possible. It is to be understood that an adjustment is also possible when the engine cowling is open.

Further, the second hinge element preferably comprises a second base area and a second cover area. A threaded connection, in particular comprising a threaded bolt and an internal thread, is provided between the second base area and the second cover area. Here, the adjustment of the second hinge element is carried out by means of a relative movement between the second base area and the second cover area. Here, only an adjustment in a third direction, namely the axis of the threaded bolt, is possible. At that, the threaded bolt is screwed in further into or out of the internal thread in order to change a relative position between the second base area and the second cover area.

Preferably, the engine cowling has a third opening, wherein the threaded bolt of the threaded connection is arranged at the third opening. Here, too, a tool can be passed through the third opening to turn the threaded bolt, so that a relative position can be adjusted.

Further, the engine cowling preferably comprises a first securing element which is arranged with play in the first and the second direction of the adjustment between the first base area and the first cover area. The play is necessary here to facilitate the adjustment of the first base area relative to the first cover area. Thus, the first securing element provides a loss-prevention device to hold together the first base area and the first cover area as one constructional unit. The first securing element preferably is a bolt with two heads or the like, wherein respectively one head is arranged at each end of the bolt.

Further, the engine cowling preferably comprises a second securing element which is arranged between the second base area and the second cover area. The second securing element can also be a bolt with two heads or can be a threaded bolt with a dedicated nut, wherein an area with a thread as well as a thread-free area are provided at the threaded bolt.

The engine cowling according to the invention preferably is an aircraft engine cowling.

In the following, a preferred exemplary embodiment of the invention is described in detail by referring to the accompanying drawing. In the drawing, identical parts or parts having the same functionality are identified by the same reference signs. In the drawings.

In the following, an engine cowling 1 according to one preferred exemplary embodiment of the invention is described in detail by referring to FIGS. 1 to 6.

Figure 1:
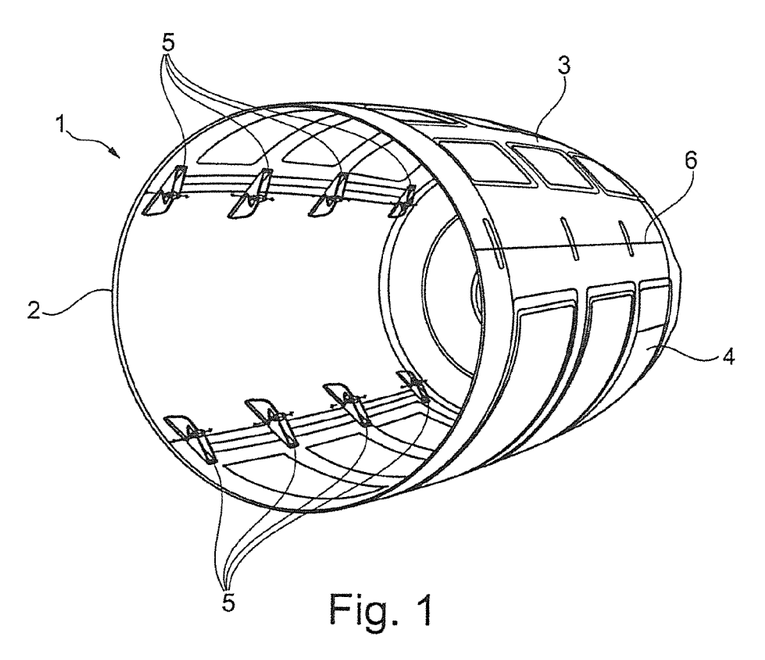
FIG. 1 shows a schematic perspective view of an engine cowling according to one exemplary embodiment of the invention.
Figure 2:
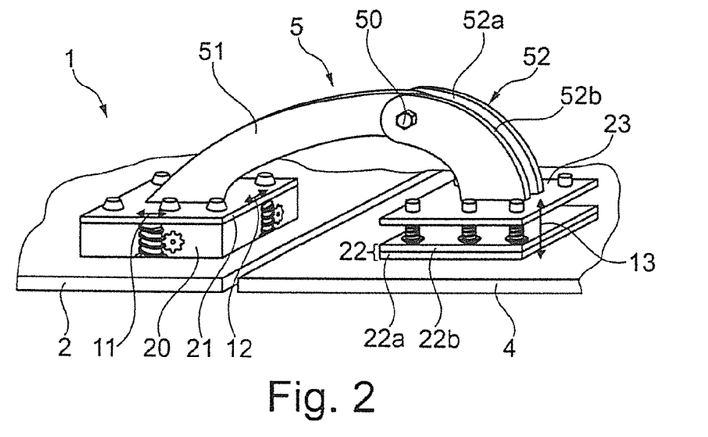
FIG. 2 shows a schematic perspective view of a hinge of FIG. 1.

FIG. 1 schematically shows a perspective view of an engine cowling 1 that forms a barrel-shaped housing around an engine that is not shown. The engine cowling 1 comprises a housing part 2 (cowling part), a first door element 3 and a second door element 4. The first door element 3 is hinged at the housing part 2 by means of a plurality of hinges 5. The second door element 4 is also hinged at the housing part 2 by means of a plurality of hinges 5. The housing part 2 is attached at an aircraft engine, or the like, with the door elements meeting at an abutment edge 6.

The door elements 3, 4 extend across the entire axial length of the engine cowling 1.

As can be seen in FIG. 1, the two door elements 3, 4 are formed so as to both have the same size, respectively covering a circumferential surface that is approximately twice the size of the circumferential surface of the housing part 2. In this manner, a larger opening area can be achieved when the two door elements 3, 4 are opened in opposite directions, so that maintenance work or the like can be performed at the engine in a simple manner.

In this exemplary embodiment, exactly four hinges 5 are provided for connecting each door element 3, 4 to the housing part 2.

The hinge 5 can be seen in detail in FIGS. 2 to 6.

The hinge 5 comprises a first hinge element 51, a second hinge element 52 and a bolt 50. The bolt 50 connects the first hinge element 51 to the second hinge element 52. Each of the hinge elements has attachment openings 54 (cf. FIG. 4) to facilitate connection of the hinge at the housing part 2 or at the door elements 3, 4.

In order to compensate for gaps and/or overlappings of neighboring door elements 3, 4 and other neighboring cowling parts of the engine cowling, each hinge has an adjusting device. Here, the hinges can be adjusted in a three-dimensional manner in a first direction 11, a second direction 12 and a third direction 13, with the three directions 11, 12, 13 being respectively perpendicular to one another.

Figure 3:
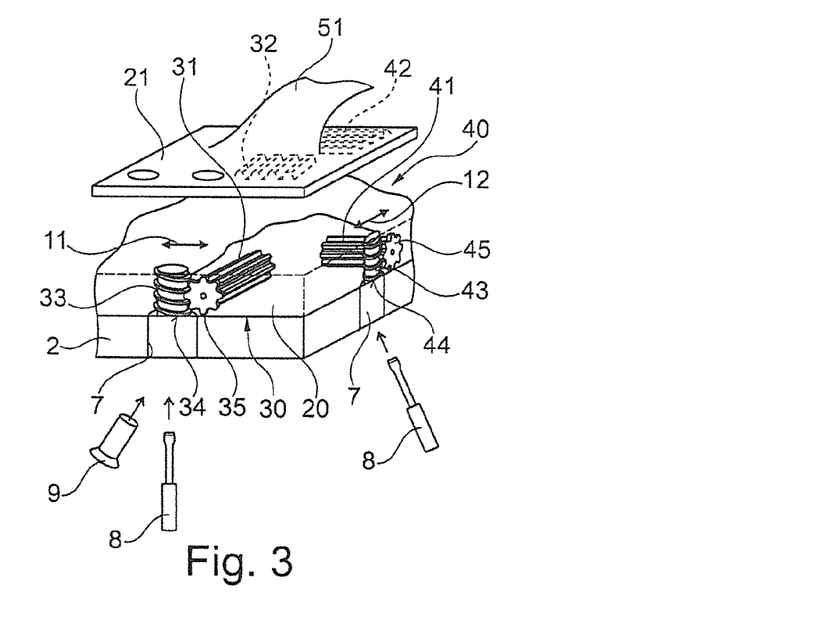
FIG. 3 shows a schematic perspective exploded view of a first hinge element of the hinge of FIG. 2.

Here, the adjusting device of the hinge is distributed to both hinge elements 51, 52. More precisely, the first hinge element 51 has a first part of the adjusting device of the hinge, which facilitates an adjustment in the first direction 11 and the second direction 12. Here, FIG. 3 schematically shows the two directions 11, 12, which are perpendicular to each other and define a plane. A second part of the adjusting device is provided in the second hinge element 52, wherein the second part of the adjusting device facilitates an adjustment only in one direction, namely the third direction 13 (cf. FIGS. 2 and 6). The three directions are indicated in the Figures by double arrows.

At that, the hinge 5 according to the first exemplary embodiment generally has such a structure that the two hinge elements 51, 52 substantially have a two-part foot with which the hinge elements are connected to the cowling parts of the engine cowling or the door elements. A hinge body or arm is then arranged at the two-part foot. As can in particular be seen in FIGS. 2 and 3, the first hinge element 51 has a first base area 20 and a first cover area 21, which together form the foot of the first hinge element 51. Here, a relative adjustment between the first base area 20 and the first cover area 21 can be facilitated by the first part of the adjusting device.

The second hinge element 52 has a similar structure, having a second base area 22 and a second cover area 23. As can be seem from FIGS. 2 and 6, the second base area 22 of the second hinge element 52 is provided by two plates, namely a first plate 22a and a second plate 22b.

A great advantage of the three-dimensionally adjustable hinge 5 is the fact that an adjustment is possible in the open as well as in particular also in the closed state of the engine cowling. This is advantageous because often it is only possible to see in the closed state of the engine cowling where gaps and/or overlappings of cowling components or the like are located.

The first part of the adjusting device of the hinge at the first hinge element 51 comprises a first rack and pinion arrangement 30 and a second rack and pinion arrangement 40. The two rack and pinion arrangements 30, 40 can be seen in detail in FIGS. 3 and 5a, 5b, 5c and 5d.

The first rack and pinion arrangement 30 comprises a first pinion 31, a first toothing area 32, a first screw element 33 with a first tool meshing area 34 and a first gear wheel 35. The first pinion 31 is connected to the first gear wheel 35, which combs with the first screw element 33. The first toothing area 32 combs with the first pinion 31 and is provided in the first cover area 21 (cf. FIG. 5a). At that, the first tool meshing area 34 of the first screw element 33 can be reached from the external side through an opening 7. In this way, the first pinion 31, which is mounted in the first base area 20, can be rotated via the first gear wheel 35 by rotating the first screw element 33. In this way, the first cover area 21 is moved relative to the first base area 20 in the direction of the first direction 11. A modification of the direction of the relative movement between the first cover area 21 and the first base area 20 is also determined by changing the rotational direction at the first screw element. In FIG. 3, a tool 8 for adjustment is indicated in a schematic manner.

The second rack and pinion arrangement 40 has the same structure as the first rack and pinion arrangement 30 with a second pinion 41, a second toothing area 42, a second screw element 43 with a second tool meshing area 44 and a second gear wheel 45. As can be seen from FIG. 3, the second rack and pinion arrangement 40 is arranged at an angle of 90° to the first gear rack pinion arrangement 30. Thus, an adjustability of the first cover area 21 relative to the first base area 20 is possible in the second direction 12.

Figure 4:
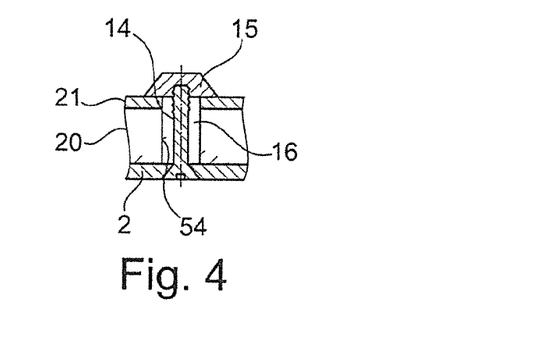
FIG. 4 shows a schematic sectional view of a securing element of the first hinge element of FIG. 3, FIGS. 5a, 5b, 5c, 5d show schematic views of an adjusting device of the first hinge element of FIG. 3.
Figure 5A:
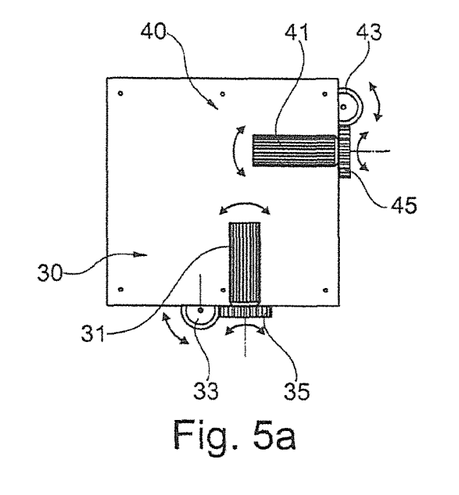
Figure 5B:
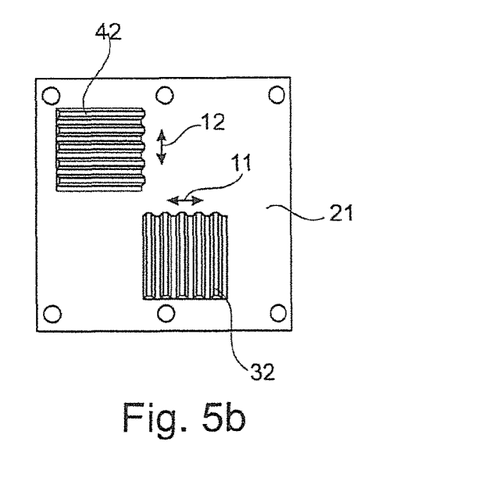
Figure 5C:
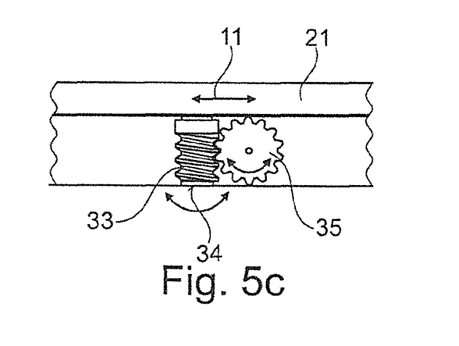
Figure 5D:
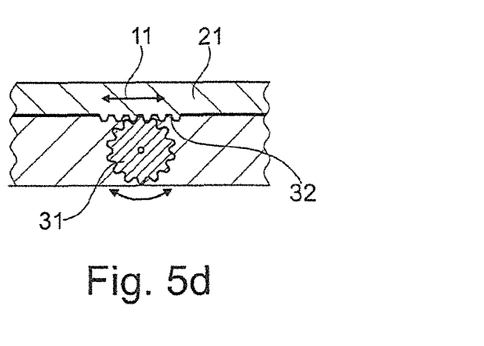

FIG. 4 schematically shows a connecting element that serves for connecting the first hinge element 51 at the housing part 2. At that, the connecting element comprises a threaded bolt 14 that is passed through the housing part 2 and the attachment opening 54 and is secured by means of a nut 15 at the first cover area 21. At that, some play 16 is provided in the attachment opening 54 in order to facilitate a relative adjustment between the first base area 20 and the first cover area 21.

In order to ensure that the engine cowling 1 is as streamlined as possible, the opening 7 can be closed for example by means of a closure cap 9 after the adjustment has been performed. This is indicated in FIG. 3.

The adjustment in the first and second direction can thus be performed in a simple and cost-effective manner. Here, a high precision in the adjustment can be obtained depending on the choice of the number of pinion teeth and of the first and second toothing areas provided on the first cover area 21.

It is to be understood that locking devices can be provided for fixing the relative position between the first base area 20 and the first cover area 21 in order to avoid any unintended displacement. What is especially preferred are locking devices, in which closure caps 9 are provided, which then fix a position of the screw elements 33, 43, so that a movement between the pinion and the toothing area is no longer possible.

The adjustment in the third direction 13 is performed at the second part of the adjusting device at the second hinge element 52. As can in particular be seen in FIG. 6, the second part of the adjusting device comprises a threaded connection 60 between the second base area 22 and the second cover area 23. The threaded connection 60 is provided by a threaded bolt 61 and an internal thread 62. The threaded bolt 61 has a third tool meshing area 63, which can be reached from an external side of the engine cowling via openings 7.

Figure 6:
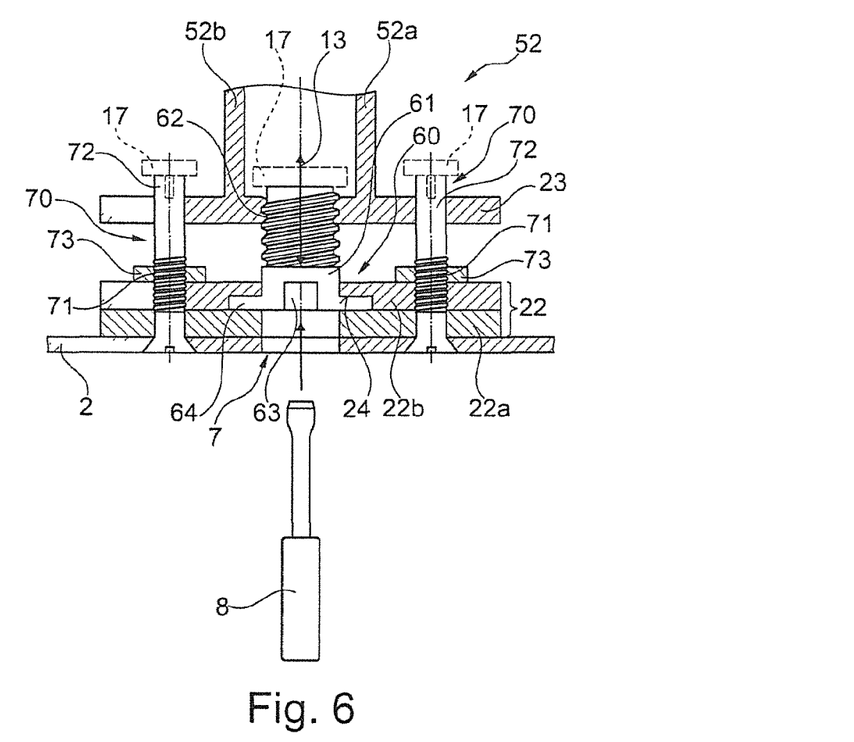
FIG. 6 shows a schematic sectional view of a second hinge element of the hinge of FIG. 2.

As can be seen in FIG. 6, the threaded bolt 61 can be rotated between the first plate 22 and the second plate 22b, while still being arranged in a loss-preventive manner. Here, the second plate 22b has a stepped recess 24, which retains a head 64 of the threaded bolt 61 in a loss-preventive manner.

As can be seen from FIG. 6, the threaded connection at the second hinge element 52 is arranged between a first leg 52a and a second leg 52b.

A locating element 70, for example a screw, with a threaded area 71 and a thread-free area 72 is provided for locating the second base area 22 at the second cover area 23.

The locating element 70 is fixed at the threaded area 71 by a nut 73 at the second base area 22 (see FIG. 6). At that, the thread-free areas 72 serve as guiding areas for guiding the second cover area 23 during adjustment.

A maximum range of adjustment between the second base area 22 and the second cover area 23 can be provided by securing elements 17, which are provided at the ends of the fixating elements 70 and of the threaded bolt 61, as shown in FIG. 6.

Thus, the engine cowling 1 according to the invention has a three-dimensionally adjustable hinge 5, wherein the hinge has an adjusting device that is distributed to the first and the second hinge element 51, 52. Here, the hinge elements 51, 52 respectively comprise a foot area with a base area and a cover area, with are adjustable with respect to each other. At that, the adjustment can be carried out from the outside, with the engine cowling being closed.

PARTS LIST 1 engine cowling
2 housing part or further cowling part
3 first door element
4 second door element
5 hinge
6 abutment edge
7 openings
8 tool
9 closure cap
11 first direction
12 second direction
13 third direction
14 threaded bolt
15 nut
16 play
17 securing element
20 first base area
21 first cover area
22 second base area
22a first plate
22b second plate
23 second cover area
24 recess
30 first rack and pinion arrangement
31 first pinion
32 first toothing area
33 first screw element
34 first tool meshing area
35 first gear wheel
40 second rack and pinion arrangement
41 second pinion
42 second toothing area
43 second screw element
44 second tool meshing area
45 second gear wheel
50 bolt
51 first hinge element
52 second hinge element
52a first leg
52b second leg
54 attachment openings
60 threaded connection
61 threaded bolt
62 internal thread
63 third tool meshing area
64 head
70 locating element 71 threaded area
72 thread-free area
73 nut

The invention claimed is:

1. An engine cowling, comprising:
a cowling part,
a door element, and
a hinge,
wherein the hinge connects the door element to the cowling part in an openable and closable manner,
wherein the hinge is three-dimensionally adjustable in a first direction, a second direction and a third direction to modify a relative position of the door element to the cowling part;
wherein the hinge comprises a first hinge element and a second hinge element, wherein the first hinge element comprises a first adjusting device for facilitating an adjustment in the first direction and the second direction, and the second hinge element comprises a second adjusting device for facilitating an adjustment in the third direction;
wherein the first hinge element includes a first base area and a first cover area, wherein the first adjusting device is connected between the first base area and the first cover area to adjust a relative position between the first base area and the first cover area;
wherein the first adjusting device includes:
a first rack and pinion arrangement with a first pinion engaging a first toothing area provided between the first base area and the first cover area for the adjustment in the first direction; and
a second rack and pinion arrangement with a second pinion engaging a second toothing area provided between the first base area and the first cover area for the adjustment in the second direction;
the first toothing area including a plurality of first teeth spaced apart from one another along the first direction and being parallel to one another, each of the plurality of first teeth extending parallel to an axis of the first pinion and parallel to the second direction;
the first pinion including a plurality of third teeth spaced apart from one another around a circumference of the first pinion, each of the plurality of third teeth extending parallel to the axis of the first pinion and parallel to the second direction to engage the first teeth in a parallel manner;
the second toothing area including a plurality of second teeth spaced apart from one another along the second direction and being parallel to one another, each of the plurality of second teeth extending parallel to an axis of the second pinion and parallel to the first direction;
the second pinion including a plurality of fourth teeth spaced apart from one another around a circumference of the second pinion, each of the plurality of fourth teeth extending parallel to the axis of the second pinion and parallel to the first direction to engage the second teeth in a parallel manner;
the second direction being perpendicular to the first direction, such that 1) rotation of the first pinion to cause the first toothing area to move along the first direction and transverse to the axis of the first pinion also causes the second toothing area to slide along the second pinion in the first direction and parallel to the axis of the second pinion, and 2) rotation of the second pinion to cause the second toothing area to move along the second direction and transverse to the axis of the second pinion also causes the first toothing area to slide along the first pinion in the second direction and parallel to the axis of the first pinion;
wherein the second adjusting device includes a threaded connection.

2. The engine cowling according to claim 1, wherein the first, second and third directions are respectively perpendicular to one other when the door element is in a closed position.

3. The engine cowling according to claim 1, wherein the first rack and pinion arrangement comprises a first screw element by which the first pinion is driven, and the second rack and pinion arrangement comprises a second screw element by which the second pinion is driven.

4. The engine cowling according to claim 3, wherein:
the first screw element and the second screw element each include a tool meshing area,
the engine cowling includes first and second openings, and
wherein the tool meshing areas of the screw elements are respectively arranged at the first and second openings such that the tool meshing areas are accessible from an external side of the engine cowling.

5. The engine cowling according to claim 1, wherein the second hinge element includes a second base area and a second cover area, wherein the second adjusting device is connected between the second base area and the second cover area to adjust a relative position between the second base area and the second cover area in the third direction.

6. The engine cowling according to claim 5, wherein the threaded connection includes a third tool meshing area arranged at a third opening in the engine cowling to be accessible from an external side of the engine cowling.

7. The engine cowling according to claim 5, wherein the threaded connection includes a threaded bolt and an internal thread.

8. The engine cowling according to claim 7, wherein the second base area comprises a first plate and a second plate, wherein the threaded bolt includes a head, and wherein the second plate includes a stepped recess for receiving the head of the threaded bolt.

9. An engine cowling, comprising:
a cowling part,
a door element, and
a hinge,
wherein the hinge connects the door element to the cowling part in an openable and closable manner,
wherein the hinge is three-dimensionally adjustable in a first direction, a second direction and a third direction to modify a relative position of the door element to the cowling part;
wherein the hinge comprises a first hinge element and a second hinge element, wherein the first hinge element comprises a first adjusting device for facilitating an adjustment in the first direction and the second direction, and the second hinge element comprises a second adjusting device for facilitating an adjustment in the third direction;
wherein the first hinge element includes a first base area and a first cover area, wherein the first adjusting device is connected between the first base area and the first cover area to adjust a relative position between the first base area and the first cover area;
wherein the first adjusting device includes:
a first rack and pinion arrangement with a first pinion and a first toothing area provided between the first base area and the first cover area for the adjustment in the first direction; and a second rack and pinion arrangement with a second pinion and a second toothing area provided between the first base area and the first cover area for the adjustment in the second direction; and wherein the first rack and pinion arrangement comprises a first screw element by which the first pinion is driven, and the second rack and pinion arrangement comprises a second screw element by which the second pinion is driven.

* * * * *